United States Patent Office 3,111,277
Patented Nov. 19, 1963

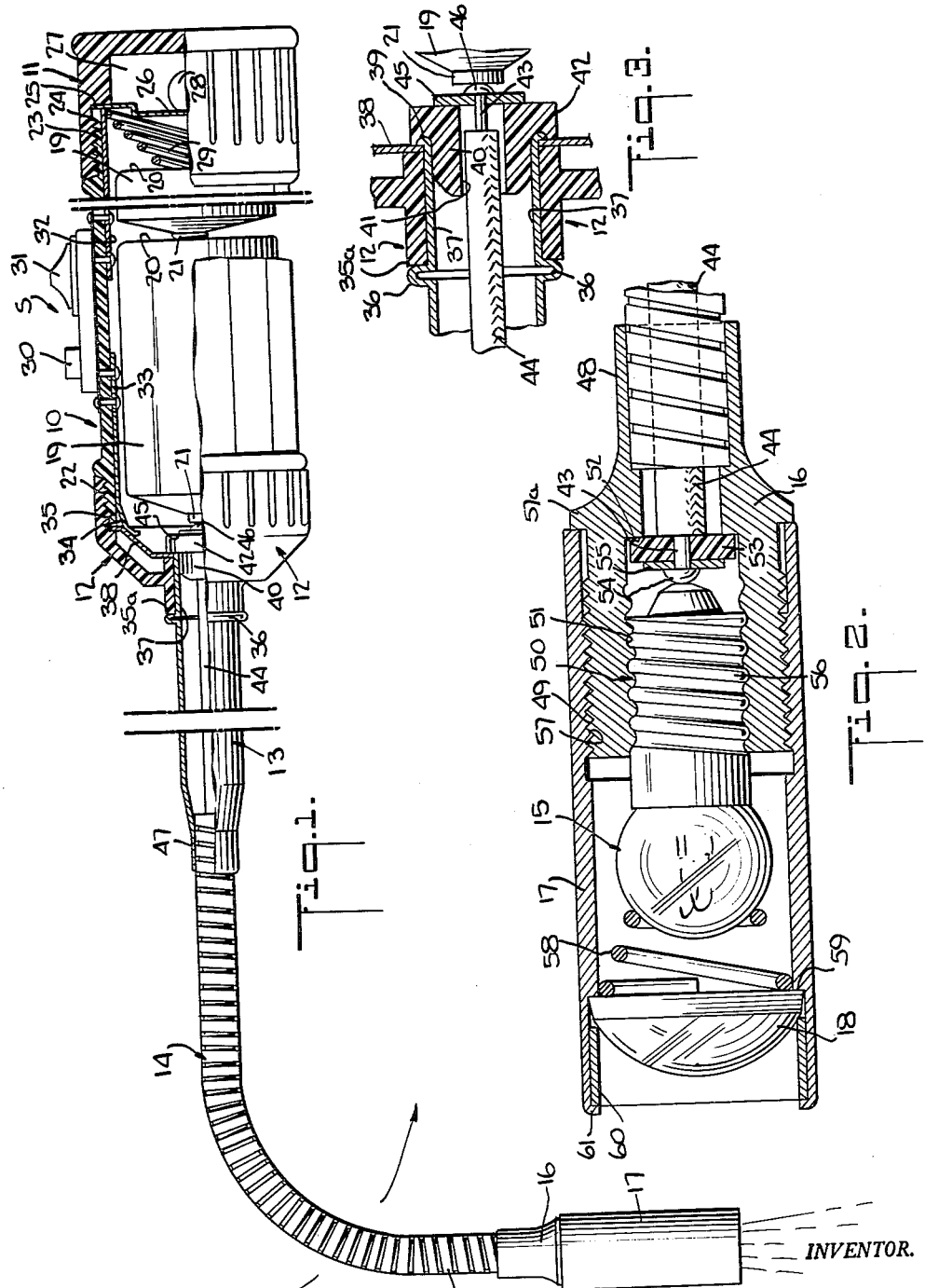

3,111,277
PORTABLE ELECTRIC FLASHLIGHT
Leopold C. Grimsley, Jackson Heights, N.Y., assignor to Henry Hyman, New York, N.Y.
Filed Jan. 31, 1961, Ser. No. 86,124
5 Claims. (Cl. 240—10.66)

This invention relates to a portable electric flashlight, and, in particular, to such a flashlight wherein the handle portion, comprising the battery or batteries and usual switch, is connected with the actual light bulb in the order named, by a rigid extension element and a flexible manually-deformable self-form-maintaining hollow conduit, or gooseneck, whereby the light may be brought in close proximity with objects to be inspected or worked upon but which are so located as to require an angled or bent probe to get near them.

The general object of the invention is to provide such a flashlight, having a handy battery case of conventional size adapted to hold one or more batteries, and to be fitted, in the usual manner with a switch, with an element constituting a rigid conduit of relatively small cross-section extending coaxially therefrom as a probe capable of being inserted through openings too small to accommodate the case, and, affixed to the outer end of the rigid conduit, a universally flexible manually-deformable self-form-maintaining conduit of suitable length of, say, some desired proportion to that of the rigid conduit, and including a light and bull's-eye lens, both within a protecting cartridge at the outer terminus of the flexible conduit.

The invention is, as will be seen, specially concerned with the provision of a portable electric flashlight having the actual light thereof substantially at the end of a gooseneck of considerable length whereby objects and parts of intricate machinery and the like may be intensely illuminated even though conditions do not permit a flashlight of conventional structure to be placed close enough to accommodate the inspector or worker. While the apparatus of the invention does not provide means for literally bending light rays around curves, it approaches the advantages of such means in providing a universally flexible conduit, which may serve as a probe, and which carries the actual light, specially protected, at its extremity.

A special feature of the invention is to provide a simple structure comprising all portions of the apparatus extending from the conventional battery and control case—i.e., the rigid conduit, the succeeding universally flexible conduit, and the protected light- and lens-cartridge—that, for any reason, may be readily detached as a whole (unit) from the case. This feature is of particular importance in the event such extension portion of the flashlight is desired to be exchanged, for whatever reason, such as damage or insufficiency of length of the extension portion. It may be said here that the ease with which the battery and control case of the flashlight may be connected to and disconnected from the extension portion of much less cross-section, as well as of the property of being partially flexible, and the protected light cartridge, renders the invention suitable for a considerable variety of different uses. For example, the same battery and control case may be used with any one of a variety of extension portions. It will be understood herein that the comparative lengths of the rigid conduit connected to the battery and control case and of the universally flexible, or gooseneck, conduit, extending beyond the rigid conduit and carrying the light cartridge at its end are, with respect to each other, more or less immaterial; and that the whole of the extension portion of the flashlight, and the proportions of rigid and flexible parts of such portion, are not critical; and that the extension portion of the flashlight may indeed be quite long, and the actual light bulb and lens cartridge at a considerable distance from the conventional battery and control case, if desired.

Another special feature of the invention is to provide a novel cartridge, or protective sleeve for the light bulb and its bull's-eye lens, to be mounted on the outer terminal of the universally flexible, or gooseneck, part of the extension portion of the flashlight. The particular object with respect to this feature is to protect both the bulb and its lens from actual contact with any object capable of damaging them; in short, to recess both the bulb and the lens within a rigid, open-ended sleeve, suitable to withstand accidental blows directed more or less laterally to the axis of the lens and the bulb. As pertaining to this it may be mentioned that the entire protective cartridge may be readily removed so that the bulb is accessible for replacement.

A further feature of the invention is to provide such a flashlight of relatively simple and rugged parts, and, particularly, of an extremely elementary circuit arrangement.

These and other objects, features, and advantages of the invention will be more fully understood from the following description, and from the drawing, in which—

FIG. 1 is a side view of the flashlight, partly in section and partly broken and condensed;

FIG. 2 is an axial sectional view, much enlarged, of the outer end portion of the flashlight, comprising the terminus of the flexible conduit, the light bulb, the bull's-eye lens, and the protective cartridge; and FIG. 3 is an axial sectional detail, much enlarged, showing the connection between the front end of the battery and control case and the rigid part of the extension portion of the flashlight.

The flashlight of the present invention is seen in its entirety—with the exception of two obvious breaks to condense the figure—in FIG. 1, a side view, partly in section and twice broken, as mentioned above, and comprises, as its principal parts, a conventional plastic battery casing 10, a sealing plastic rear end portion 11, a plastic head portion or cap 12, adapted to seal the front end of the casing and rigidly to connect thereto a rigid electrically conductive metal conduit 13 of considerably less cross-section than that of the battery casing and concentric therewith, a universally flexible manually-deformable self-form-maintaining electrically conductive metal conduit or gooseneck 14 forming an extension of the rigid conduit 13, a light bulb 15 beyond the outer end of the flexible conduit 14 and mounted within an electrically conductive socket 16 rigidly and captively secured to the end of the flexible conduit, and an open-ended rigid protective cartridge 17 enclosing the light bulb 15, its socket 16, and a transparent bull's-eye lens 18.

The structure of the unit comprising the protective cartridge 17, the light bulb 15, the bull's-eye lens 18, and the socket 16, and the junction of the latter to the outer end of the flexible conduit 14, are best illustrated in FIG. 2, an axial sectional and partly erased enlarged detail. The structure associated with the junction of the battery casing 10 and the head portion or cap 12, and of the latter and the rear end of the rigid conduit 13, are best illustrated in the enlarged axial sectional erased detail of FIG. 3.

The battery casing 10 is a conventional hollow cylinder, preferably made of moldable insulating material. e.g. synthetic plastic, and adapted easily to be held in the hand and to contain one or more batteries—preferably two engaged under compression in series, in the usual manner, and of the cylindrical type having insulating sleeves with the poles of the battery exposed at the ends. Two batteries 19 are shown; the exposed pole (or base) of each battery is designated 20, and the slightly protruding opposite pole (shown as a button) of each battery is indexed 21.

A switch (more particularly described below) generally designated S, is mounted on one side of the casing 10 so as to be convenient to the thumb of the handler (FIG. 1).

The battery casing 10 is slightly longer than necessary to hold two batteries in series, as shown in FIG. 1 so that sufficient space is provided in the rear portion of the casing to accommodate a spare bulb. The casing 10 is provided at the front and rear end portions with male threads 22 and 23 respectively to mesh with internal threads of the head portion or cap 12 and with similar threads of the sealing rear end portion 11.

The rear end portion 11, provided as a seal for the corresponding end of the battery casing 10, is a cylindrical cup of slightly more than usual depth; and it is preferably made of the same material as casing 10. From the open end of portion 11 to somewhat more than half the depth of the cup internal threads 24 are provided to engage the male threads 23 of the casing 10. The engagement is shown in FIG. 1. The internal diameter of portion 11 deeper therein than threads 24 is slightly reduced, forming an annular shoulder at 25 adapted to engage a circular and preferably rigid bridge element 26 and to jam the ends thereof against the rear end of casing 10. Thus a small chamber 27 is provided at the rear of the battery-containing part of the flashlight for storage of a spare light bulb 28 prehensiley held in a pair of resilient clip arms (not shown) integral with the bridge 26. The rear pole (or base) 20 of battery 19 engages the tip of a tapered helical compression electrically conductive spring 29 the base of which abuts element 26, and, according to common practice in flashlight construction, forces both batteries into intimate series contact, so that the button 21 of the rear battery engages the base 20 of the forward battery, and thet button 21 of the forward battery is pressed against a conductor (see below) which is adapted to convey current to the terminal contact of the light bulb.

The switch S is of well-known construction, and is riveted or otherwise fixed to the side of casing 10, and also operates in usual manner—a spring-cushioned button 30 is provided for completing the circuit so long as pressure is applied to it, and a sliding element 31, maintained at stations on its track by manually overridable detents, keeps the circuit closed when moved to one extreme, and opens the circuit when moved to the opposite extreme. In its mid position the element 31 renders the button 30 operative. FIG. 1, the only figure in which the switch is seen, shows the mechanism in full even though the adjacent part of casing 10 is in section. One lead of the circuit controlled by the switch is preferably a flat strip 32 of brass or other suitable electrically conducting material, and is rigidly riveted, as shown, to the inside of casing 10 and extends rearwardly to and engages the base of the compression spring 29 which in turn engages the base 20 of the rear battery 19. The other lead of the circuit controlled by the switch is also preferably a flat strip 33 of brass or other suitable electrically conducting material, and is also rigidly riveted, as shown, to the inside of the casing and extends forwardly to and slightly beyond the end of the casing 10 proper, and is there deflected radially inwardly slightly, and just forward of the front battery 19. The strip is of spring stock, so that the unsupported, i.e. free, inwardly deflected end portion 34 (clearly seen in FIG. 1) tends to straighten into alignment with the rest of the strip 33.

The head portion or cap 12 is a cup-shaped element, which may also be made of the same material as the casing 10. Like the rear portion 11 it is adapted to be screwed into position as a seal, on one end, i.e., the front end, of the casing 10 whereby the cap is detachably secured to the front end of the case by a rapidly manually operable means. The head portion or cap 12, is, largely for convenience and appearance, shaped like a cylinder merging into a truncated forwardly tapering cone, with a short coaxial cylindrical portion of lesser diameter protruding forwardly of the cone (see FIG. 1). From the rear opening of the cap portion 12 a short helix of internal threads 35 is provided to engage male threads 22 of casing 10. The engagement is shown in FIG. 1. The cap 12 is centrally perforated to receive the rear end of the rigid electrically conductive conduit 13, which, as has been said, is of much less cross-section than the battery-containing assembly and is tubular. Details of the junction of the conduit 13 and cap 12 are best understood from FIG. 3 which is an axial section.

The outer diameter of the rigid conduit 13 is of course not critical, but is suitable easily to be inserted through small openings of machinery and other assemblies. Essentially conduit 13 is a more or less elongated probe small enough to be introduced through passages incapable of accommodating the battery-containing part of the flashlight and, naturally the worker's hand. The conduit 13 is an electrical conducting pipe, and may be of brass. The conduit functions as one lead of the battery circuit of the flashlight, and must be adapted to contain the other, and insulated, lead of the circuit. Much of the foregoing applies also to the flexible conduit 14 which is actually a flexible manually-bendable self-form-maintaining extension of the conduit 13.

It is of importance herein that the conduit 13 be, and remains during use rigidly connected to the battery-containing part of the flashlight, and positively in electrical communication with the lead strip 33 extending forwardly from the switch; and that the other lead of the circuit carried within the conduit 13 be in positive electrical contact with the button 21 of the forward battery.

The forwardly protruding cylindrical portion 35a of the head portion or cap 12 is axially perforate, the inside diameter being substantially that of the outside diameter of the rigid conduit 13. Actually the cylindrical portion 35a is a sleeve, integral with the rest of the head portion or cap 12, as is shown in FIGS. 1 and 3.

The extreme rear end 37 of the rigid conduit 13 is separated from the rest of the conduit by a radially outwardly extending annular flange 36 surrounding the outside of the conduit. In assembly, that part 37 of the conduit 13 to the rear of flange 36 is inserted (preferably somewhat force-fitted) into portion or sleeve 35a until the flange 36 abuts the sleeve 35a. See FIG. 3 particularly. Part 37 is slightly longer than the sleeve 35a. Fitted around the rear end of the part 37, in firm electrical contact therewith, is an electrically conducting centrally and circularly perforate dish or element 38 of truncated conical or fragmentarily spherical shape, preferably of brass, which is of sufficient outside diameter to contact the tip 34 of the forward strip 33 and engage such portion under some pressure when the head portion or cap 12 is firmly screwed into position, as shown only in FIG. 1. The rim of the dish 38 is a flat annular flange that is clamped between the cap 12 and the front end of the casing 10.

The actual rear end of the part 37 of the rigid conduit 13 is peened at 39 as shown best in FIG. 3, to form a flange securely affixing the dish 38 to the rear end of the rigid conduit 13.

Force-fitted or otherwise suitably secured into the inner rear end of the rigid conduit 13 is a plug 40 of electrical insulating material, such as a synthetic plastic, having a central perforation 41 and an annular flange 42 at its rear portion which, in assembly, engages the actual peened annular end of part 37 of rigid conduit 13. FIGS. 1 and 3.

The rigid conduit 13, which is preferably a metal tube of adequate length, houses a flexible wire 43, covered, except at its extremities, by an insulating sheath 44. This wire connects the button 21 of the forward battery with the usual base contact of the light bulb 15, to be more fully discussed later. As is shown only in FIG. 3, the insulating sheath 44 terminates within the perforation 41 of the plug 40; and the wire 43 continues rearwardly through the perforation and is provided, at its extreme end, with a metal (preferably brass) disk 45 to which it may be soldered or peened, to form a contact button 46. Whatever structural method is employed, a contact is provided for engagement under pressure (due to the spring 29) with the central button 21 of the forward battery. The disk 45 which is plainly of a diameter much greater than that of perforation 41 of the plug 40, serves to prevent accidental withdrawal of the terminal contact of the wire 43 from the position shown in FIG. 3.

Rigid conduit 13 is provided at its outer end 47 with an extension in the form of the earlier-mentioned universally flexible or gooseneck hollow elongated conduit 14, which is preferably a well-known helix of metal strip constructed and designed to form interlocking turns so that said conduit can be bent manually but will retain any shape to which it is bent. The conduit 13 is preferably swaged at 47 to securely join the forward end of said rigid conduit 13 to the rear end of the flexible conduit 14. See FIG. 1. The wire 43 continues from conduit 13 into conduit 14 and so to the light bulb 15. See below.

As has been said before the individual and comparative lengths of the conduits 13 and 14 are not material. Such lengths as are suitable for certain illumination jobs may be selected, particularly in view of the fact that the whole extension portion of the flashlight may be readily unscrewed from the battery-containing assembly, and that extension assemblies of various lengths and characteristics may be used in connection with the same battery-containing assembly.

Since, in FIG. 1, the rigid conduit 13 is broken to condense the figure, it is impossible to estimate the comparative lengths of the conduits 13 and 14, and, of course, this of little consequence. The flexible or gooseneck conduit 14 is shown to be bent so that the light is aimed at 90° to the axis of the battery-containing assembly. Plainly, considering the illustrated construction, the light could be aimed at any station within a theoretical sphere except that occupied by the battery-containing assembly and the hand of the user.

The outer end portion of the flexible or gooseneck conduit 14 is preferably swaged within a tubular extension 48 provided on the rear of the socket 16 (see FIG. 2). Said socket is an electrically conducting and preferably brass element of general cylindrical form, having at its rear the tubular extension 48. The forepart of the body of the socket which is of considerably greater diameter than extension 48 is provided with a helix of male threads 49. The socket is centrally bored, and is of stepped diameters, that of the forepart being relatively large and that of the rear portion, and particularly including the extension 48, is only large enough to freely receive the forward end of the flexible conduit 14. The front portion 50 of the bore of the socket is provided with female threads 51 to engage male threads 56 of the light bulb 15. The bore portion 50 is bottomed at 52. A disk 53 of suitable electrical insulating material is seated on the bottom of the bore 50; on the rear side of said disk the insulating sheath 44 terminates, and the wire 43 continues through an aperture in the disk 53, and soldered or peened thereon is a metal disk 55 providing a contact button 54 which prevents wire 43 from accidentally being pulled out of the socket 16.

The light bulb 15, generally so referred to, is the usual lamp assembly of a glass envelope enclosing the filament and secured to a male threaded base, the latter being here indexed 56. The base screws into the socket 16 as clearly shown in FIG. 2.

Mounted on the outside of the socket 16 and extending beyond the front end thereof, beyond the light bulb 15 and beyond the bull's-eye lens 18, is a protective metal sheath, or tube, 17, previously mentioned, having a helix of female threads 57 in the rear portion thereof to engage with the male threads 49 of the socket 16. An annular protruding flange 57a limits such engagement. The protective sheath or tube 17 extends sufficiently forward of the socket to shield laterally the light bulb and the bull's-eye lens, as clearly illustrated in FIG. 2.

The bull's-eye lens is maintained somewhat forward of the light bulb by a relatively weak helical spring 58, and may be also positioned permanently, as shown, by an internal annular ledge 59 provided in the forepart of the protective sheath or tube 17. Here, to maintain the bull's-eye lens within the sheath or tube 17 is an inset annular sleeve 60. The sleeve 60 may be fixed in position by peening the forward end 61 of the sheath 17.

It thus will be seen that I have provided a device which achieves the several objects of this invention, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a portable electric flashlight, a rigid casing, carrying at least one battery therein and having a switch convenient to the user of such flashlight mounted thereon and controlling the circuit of said battery, said casing having threads at an end thereof; a threaded electrically nonconductive cap screwed on the front end of the casing, said cap having an opening therethrough; an electrically conductive rigid tube having an end located in said cap and rigidly secured to the cap; means electrically connecting the tube to a pole of said battery; an electrically conductive manually deformable self-form-maintaining tube secured to the front end of the rigid tube; a single flexible lead extending through both said tubes and being electrically connected to the other pole of the battery; a socket including an electrically conductive rigid tube rigidly and electrically connected to the front end of the flexible tube and a central electrical contact rigidly carried by and insulated from the tube and electrically connected to the front end of the flexible lead; a light bulb in said socket; and a protective sleeve enclosing a major portion of said socket and all of said light bulb, said sleeve being of lesser cross-section than the cross-section of the rigid casing and in the order of the cross-section of the manually deformable tube.

2. The combination of claim 1 wherein the means electrically connecting the rigid tube to a pole of the battery includes an electrically conductive resilient strip carried by the casing and electrically connected to a pole of the battery and an electrically conductive disc carried and housed by the cap and electrically connected to the rigid tube, said tip having a front end resiliently bearing on the disc.

3. The combination of claim 1, wherein such protective sleeve contains a wholly recessed plano-convex bull's-eye lens in front of such light bulb with the plane side facing the light bulb and the convex side facing outwardly.

4. The combination of claim 1 wherein the opening in the cap is centrally disposed and is formed by an open-ended axially extending electrically nonconductive sleeve integral with the cap and protruding both forwardly and rearwardly thereof, said electrically conductive rigid tube having the rear portion thereof received in said electrically nonconductive sleeve and including a pair of axially spaced outwardly extending flanges pressing against opposite ends of the electrically nonconductive sleeve to rigidly secure the electrically conductive rigid tube to the electrically nonconductive sleeve.

5. The combination of claim 4 wherein the means electrically connecting the rigid tube to a pole of the batteries includes an electrically conductive resilient strip carried by the casing and electrically connected to a pole of the battery and an electrically conductive centrally apertured disc fitted around the rear end of the rigid tube and pressed by the rearmost flange against the rear end of the electrically nonconductive sleeve, said disc being carried and housed by the cap and being electrically connected to the rigid tube, said tube having a front end resiliently bearing on the disc.

References Cited in the file of this patent

UNITED STATES PATENTS

| | | |
|---|---|---|
| 1,145,586 | Herold | July 6, 1915 |
| 1,530,862 | Thompson | Mar. 24, 1925 |
| 1,559,481 | Voorhees | Oct. 27, 1925 |
| 1,717,067 | Rosebraugh | June 11, 1929 |
| 2,029,861 | Dabgin | Feb. 4, 1936 |
| 2,510,873 | Early | June 6, 1950 |
| 2,613,314 | Garland | Oct. 7, 1952 |
| 2,648,762 | Dunkelberger | Aug. 11, 1953 |
| 2,705,279 | Berlinger | Mar. 29, 1955 |
| 2,806,100 | Schildbach | Sept. 10, 1957 |

FOREIGN PATENTS

| | | |
|---|---|---|
| 980,103 | France | Dec. 20, 1950 |